United States Patent
Mossbrook et al.

(10) Patent No.: US 6,231,953 B1
(45) Date of Patent: *May 15, 2001

(54) METHOD OF PRINTING A SUBSTRATE AND ARTICLE PRODUCED THEREBY

(75) Inventors: Mendy W. Mossbrook, Moore; Kenneth M. Register, Simpsonville; Chien-Lu Hsu, Greer; J. Milton Bowen, Anderson, all of SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,461

(22) Filed: Feb. 9, 1999

(51) Int. Cl.$^7$ .................................................. B32B 27/14
(52) U.S. Cl. .......................... 428/195; 428/235; 428/327; 428/500; 428/522
(58) Field of Search ................................. 428/195, 235, 428/327, 500, 522

(56) References Cited

U.S. PATENT DOCUMENTS

| | | |
|---|---|---|
| 3,037,949 | 6/1962 | Bonvicinl et al. . |
| 3,043,787 | 7/1962 | Bonvicinl et al. . |
| 3,216,885 | 11/1965 | Schaufelberger . |
| 4,064,296 | 12/1977 | Bornstein et al. ....................... 428/35 |
| 4,073,992 | 2/1978 | Lerman et al. . |
| 4,120,716 | 10/1978 | Bonet ..................................... 156/272 |
| 4,879,430 | 11/1989 | Hoffman ............................... 428/35.1 |
| 5,407,708 | 4/1995 | Lovin et al. ........................... 427/493 |
| 6,051,305 | * 4/2000 | Hsu ....................................... 428/195 |

FOREIGN PATENT DOCUMENTS

| | | |
|---|---|---|
| 1 005 332 | 9/1965 | (GB) . |
| 57-209973 | 12/1982 | (JP) . |

OTHER PUBLICATIONS

Wild et al., J. Poly. Sci.—Poly. Phys. Ed., vol. 20,441 (1982).

"Optical properties of Packaging Materials," *Journal of Plastic Film & Sheeting*, vol. 9, No. 3, pp. 173–180 (Jul. 1993).

1990 Annual Book of ASTM Standards, Section 8, vol. 08.01, ASTM D 1003, "Standard Test Method for Haze and Luminous Transmittance of Transparent Plastics", pp. 358–363.

* cited by examiner

Primary Examiner—Bruce H. Hess
Assistant Examiner—Michael Grendzynski
(74) Attorney, Agent, or Firm—Daniel B. Ruble

(57) ABSTRACT

In a printed film, an ink containing a resin that includes a polymer which includes mer units derived from at least one $C_2$–$C_{12}$ α-olefin is adhered directly to the surface layer of the film. The surface layer includes a polymer that contains mer units derived from ethylene. The ink has good adhesion to the surface layer due to its low polarity relative to standard nitrocellulose/polyamide or nitrocellulose/polyurethane-based ink formulations

21 Claims, No Drawings

METHOD OF PRINTING A SUBSTRATE AND ARTICLE PRODUCED THEREBY

BACKGROUND INFORMATION

1. Field of the Invention

The present invention relates to printing, specifically to printing on moving substrates, and more specifically to printing on moving flexible sheets and films, particularly those of the type used in product packaging.

2. Background of the Invention

The printing of moving substrates, particularly flexible thermoplastic substrates such as are used in packaging, continues to be an area of industrial interest and research. The printing of such substrates presents several issues including short-term and long-term adhesion, opacity, resistance of the substrate to blocking, resistance of the substrate surface and the printed image to abuse, scuffing of the printed image, and the like.

Among the various substrates that undergo printing, flexible sheets and films (hereinafter collectively referred to as "films") used for packaging applications present special problems resulting from the variety of end-use requirements which they are expected to meet. Specifically, packaging made from or incorporating such films must be capable of adequately protecting the product(s) enclosed therein. Depending on the particular product, characteristics required of such films include, inter alia, providing a barrier to one or more gases (e.g., oxygen), providing high transmission of one or more gases (e.g., carbon dioxide and/or oxygen), odor retention or transmission, resistance to abuse, easy sealability, provision of a strong seal(s), ability to withstand elevated temperatures and/or pressures, and the like. The particular combination of requirements of course depends on the particular end use application.

Despite the variety of end use applications to which packaging films are put, they nevertheless must be able to display words and pictorial images in a manner that informs consumers and entices them to purchase the product packaged therein. To do so, the printed words and/or images must be adhered securely to a layer of the film, normally the outermost layer. Depending on the particular film structure mandated by the particular end use application, whole new sets of problems are presented to the skilled artisan.

Because of their desirable sealing characteristics, films with polyolefin sealing layers are used for a variety of end use applications. Of the polyolefins, ethylene-based layers are most widely used. However, many inks used in the printing of films are nitrocellulose/polyamide or nitrocellulose/polyurethane-based formulations. Because of chemical incompatibility between polyolefin-containing layers and such inks, printed images often do not adhere well to films with polyolefin-containing outer layers. This lack of adherence manifests itself sometimes immediately, e.g., the ink smears while the film is being further processed, and sometimes after the passage of time, e.g., the ink lifts off the film onto the fingers of the end-use consumer.

Many solutions have been proposed to overcome this problem. One solution is to print the image(s) on another, more compatible layer of the film and then to laminate the polyolefin seal layer over the printed portion of the film. This method often is called trap printing. However, it involves a separate lamination step which involves the added costs and difficulties of an additional manufacturing step. Additionally, trap printing becomes impracticable where the film in question is oriented and its end use involves heat shrinking. This is due to the tendency of the films to shrink at different rates, thus resulting in a distorted image.

Another more common solution is to chemically or physically prime the outer surface of the seal layer so as to make it more receptive to ink(s) being applied thereto. Physical priming involves roughening the outer, to-be-printed surface by, for example, an oxidizing treatment such as corona discharge or flame. Although physical priming solves the ink adhesion problem, the roughened surface can behave differently for other purposes such as, for example, machinability. Loss of machinability can result in lower productivity and throughput. Additionally, surface treatments can crosslink polymer chains, especially those in the surface layer, which can decrease the sealability of the film. Further, such surface treatments tend to degrade over time, especially where surface active agents (e.g., slip agents, antifog agents, etc.), thus limiting the shelf-life of the film.

Chemical priming involves the application of a layer of a material that acts to compatibilize the layer in question and the ink(s). Typical primers include ethylene/vinyl acetate copolymer (hereinafter "EVA") and/or ethylene/acrylic acid copolymer (hereinafter "EM"). However, application of a separate primer layer not only adds time and expense to the printing process, it also lessens the numbers of colors that can be applied to a given film. Specifically, a press operator normally must substitute primer for the pigmented ink normally supplied by the first print station. Thus, printing flexibility can be lost and tedious press set up and cleaning can be incurred due to the use of a primer. Further, because primers typically are clear, achieving proper registration is very difficult Where priming of the film surface is undertaken, regardless of whether that priming is chemical or physical in nature, the resulting benefits can be lost over time due to migration of slip agent from the interior of the film to the outer surfaces thereof. Often, a slip agent such as, for example, an amide-based wax commonly is added to increase the machinability of a film by reducing its coefficient of friction. However, not surprisingly, such waxes also reduce the ability of films to adhere to ink(s) printed thereon.

Additionally, for many end use applications, one or more antifogging agents are added to the blend from which surface layers are made. Antifogging agents decrease the surface tension of the surface layers; however, in the process, they also can interfere with the ability of ink to adhere those same surface layers. The tendency of antifogging agents to migrate away from a surface where they are included also is well known.

The manufacture of certain types of films can involve the use of lubricants (e.g., silicone) on the surface of the film to aid in machinability during processing. Such lubricants also can interfere with the ability of ink to adhere to the surface layer(s).

Thus, a need remains for a method of printing films that include a polyolefin-based seal layer in which that layer need not be primed. Preferably, such a method can account for the decrease in printability associated with the presence of slip and antifogging agents.

SUMMARY OF THE INVENTION

Briefly, the present invention provides a printed film that includes a surface layer and, directly adhered to the surface layer, an ink including pigment particles dispersed in a resin. The surface layer includes a polymer that contains mer units derived from ethylene while the resin of the ink includes a polymer containing mer units derived from at least one $C_2$–$C_{12}$ α-olefin. The resin has a polarity greater than that of the aforementioned polymer of the surface layer.

The just-described printed film also can include a second ink, also including pigment particles dispersed in a resin, which is applied only to those areas of the film already printed by the first ink. The resin of the second ink advantageously can have a polarity greater than that of the resin of the first ink.

Of course, a package can be provided in which the printed film of the present invention substantially completely surrounds a packaged article.

The printed film of the present invention overcomes the poor adhesion normally seen in conjunction with films having a surface layer that includes a polymer with mer units derived from ethylene by employing an ink that includes a resin that contains a polymer containing mer units derived from at least one $C_2$–$C_{12}$ α-olefin. Although the polarity of this polymer generally is greater than that of the surface layer polymer, it is less than that of the polymers typically used as ink resins such as, for example, the aforementioned nitrocellulose/polyamide or nitrocellulose/polyurethane-based formulations. The relatively similar polarities of the surface layer polymer and the ink resin polymer used in the printed film of the present invention assist in adhering the ink to the surface layer of the film.

Once a layer of ink that includes a resin that contains a polymer containing mer units derived from at least one $C_2$–$C_{12}$ α-olefin has been deposited on the surface layer of a film, it can act as a "base coat" for depositing subsequent other layers of ink. For example, such a layer can be overprinted with a standard ink (e.g., a polyamide, nitrocellulose/polyamide or nitrocellulose/polyurethane-based formulation) with good adherence between the surface layer and the first layer of ink and between the first and second layers of ink. This overprinting technique can be used to great advantage in print jobs requiring the use of white ink. By including white pigment in both the first and second ink layers, one can obtain a printed film with ink coverage, opacity, and brightness that are difficult, if not impossible, to achieve with previously available techniques.

The following definitions apply hereinthroughout unless a contrary intention is expressly indicated:

"disposed on," with respect to the location of an ink in relation to the surface layer of the printed film, means coated on or applied to such that it is in intimate contact with a primary surface of the film;

"flexible" means capable of deformation without catastrophic failure;

"polymer" means the polymerization product of one or more monomers and is inclusive of homopolymers, copolymers, and interpolymers as well as blends and modifications thereof;

"mer unit" means that portion of a polymer derived from a single reactant molecule; for example, a mer unit from ethylene has the general formula —$CH_2CH_2$—;

"homopolymer" means a polymer consisting essentially of a single type of repeating mer unit;

"copolymer" means a polymer that includes mer units derived from two reactants (normally monomers) and is inclusive of random, block, segmented, graft, etc., copolymers;

"interpolymer" means a polymer that includes mer units derived from at least two reactants (normally monomers) and is inclusive of copolymers, terpolymers, tetrapolymers, and the like;

"polyolefin" means a polymer in which some mer units are derived from an olefinic monomer which can be linear, branched, cyclic, aliphatic, aromatic, substituted, or unsubstituted (e.g., olefin homopolymers, interpolymers of two or more olefins, copolymers of an olefin and a non-olefinic comonomer such as a vinyl monomer, and the like);

"(meth)acrylic acid" means acrylic acid and/or methacrylic acid;

as a verb, "laminate" means to affix or adhere (by means of, for example, adhesive bonding, pressure bonding, corona lamination, and the like) two or more separately made film articles to one another so as to form a multilayer structure; as a noun, "laminate" means a product produced by the affixing or adhering just described;

"directly adhered," as applied to film layers, means adhesion of the subject film layer to the object film layer, without a tie layer, adhesive, or other layer therebetween.

"between," as applied to film layers, means that the subject layer is disposed in the midst of two object layers, regardless of whether the subject layer is directly adhered to the object layers or whether the subject layer is separated from the object layers by one or more additional layers;

"inner layer" or "internal layer" means a layer of a film having each of its principal surfaces directly adhered to one other layer of the film;

"outer layer" means a layer of a film having less than both of its principal surfaces directly adhered to other layers of the film;

"inside layer" means the outer layer of a film in which a product is packaged that is closest relative to the other layers of the film, to the packaged product;

"outside layer" or "surface layer" means the outer layer of a film in which a product is packaged that is farthest, relative to the other layers of the film, from the packaged product;

"barrier layer" means a film layer capable of excluding one or more gases (e.g., $O_2$);

"abuse layer" means an outer layer and/or an inner layer that resists abrasion, puncture, and other potential causes of reduction of package integrity and/or appearance quality;

"tie layer" means an inner layer having the primary purpose of providing interlayer adhesion to adjacent layers that include otherwise non-adhering polymers;

"bulk layer" means any layer which has the purpose of increasing the abuse resistance, toughness, modulus, etc., of a multilayer film and generally comprises polymers that are inexpensive relative to other polymers in the film which provide some specific purpose unrelated to abuse resistance, modulus, etc.; and "seal layer" (or "sealing layers" or "heat seal layer" or "sealant layer") means
(a) with respect to lap-type seals, one or more outer film layer(s) (in general, up to the outer 75 μm of a film can be involved in the sealing of the film to itself or another layer) involved in the sealing of the film to itself, another film layer of the same or another film, and/or another article which is not a film,
(b) with respect to fin-type seals, an inside film layer of a package, as well as supporting layers within 75 μm of the inside surface of the innermost layer, involved in the sealing of the film to itself, or (c) with respect to flap-type seals one or more outer film layer(s) involved in the sealing of the film to itself or to a tray around which the film is wrapped; and as a noun, "seal" means a bond of a first region of a film surface to a second region of a film surface (or opposing film surfaces) created by heating (e.g., by means of a heated bar, hot air, infrared radiation, ultrasonic sealing, etc.) the regions (or surfaces) to at least their respective softening points so as to cause bonding between polymer chains.

DETAILED DESCRIPTION OF ILLUSTRATIVE EMBODIMENTS

The present invention relates to the printing of flexible substrates, particularly thermoplastic packaging films. Such films find wide use throughout industry and come in a variety of forms and end-use characteristics. The present invention relates to packaging films with an outside layer that contains a polymer which includes mer units derived from ethylene. Whether the film contains one layer or more than one layer is unimportant as long as the film remains satisfactory for the particular end use application for which it is intended.

Although ethylene homopolymer can be used as the polymer including mer units derived from ethylene, interpolymers are preferred. Exemplary interpolymers include those that include mer units derived from one or more of $C_3$–$C_{20}$ α-olefins, vinyl acetate, (meth)acrylic acid, and $C_1$–$C_{20}$ esters of (meth)acrylic acid. Ionomers also can be useful. Preferred interpolymers are ethylene/α-olefin copolymers.

The relatively recent advent of single site/type catalysts (e.g., metallocenes) necessitates further definitional clarification when discussing ethylene homo- and copolymers. Heterogeneous polymers are those having relatively wide variation in molecular weight and composition distribution. Polymers prepared with, for example, conventional Ziegler Natta catalysts are heterogeneous. Such polymers can be used in the outside layer of the film, as well as a number of other layers of the film where it has multiple layers.

On the other hand, homogeneous polymers have relatively narrow molecular weight and composition distribution. Homogeneous polymers differ structurally from heterogeneous polymers in that they exhibit a relatively even sequencing of comonomers within a chain, a mirroring of sequence distribution in all chains, and a similarity of chain lengths, i.e., a narrower molecular weight distribution. Homogeneous polymers typically are prepared using metallocene or other single site-type catalysts. Homogeneous polymers also can be used in the printed film of the present invention.

The term "ethylene/α-olefin interpolymer" as used herein refers both to heterogeneous materials such as low density polyethylene (LDPE), medium density polyethylene (MDPE), linear low density polyethylene (LLDPE), and very low and ultra low density polyethylene (VLDPE and ULDPE), as well as to homogeneous materials which, in general, are prepared by the copolymerization of ethylene and one or more α-olefins. Preferably, the comonomer(s) is/are one or more $C_4$–$C_{20}$ α-olefins, more preferably one or more $C_4$–$C_{12}$ α-olefins, and most preferably one or more $C_4$–$C_8$ α-olefins. Particularly preferred α-olefins include 1-butene, 1-hexene, 1-octene, and mixtures thereof. In general, from about 80 to 99 weight percent ethylene and from 1 to 20 weight percent α-olefin, preferably from about 85 to 95 weight percent ethylene and from 5 to 15 weight percent α-olefin, are copolymerized in the presence of a single site catalyst Examples of commercially available homogeneous materials include the metallocene catalyzed Exact™ resins (Exxon Chemical Co.; Baytown, Tex.), substantially linear Affinity™ and Engage™ resins (Dow Chemical Co.; Midland, Mich.), and Tafmer™ linear resins (Mitsui Petrochemical Corp.; Japan).

Homogeneous ethylene/α-olefin interpolymers can be characterized by one or more methods known to those of skill in the art, such as molecular weight distribution ($M_w/M_n$), composition distribution breadth index (CDBI), narrow melting point range, and single melt point behavior. The molecular weight distribution, also known as polydispersity, can be determined by, for example, gel permeation chromatography. Homogeneous ethylene/a-olefin copolymers to be used in a layer of the film of the present invention preferably have an $M_w/M_n$ of less than 2.7; more preferably from about 1.9 to 2.5; still more preferably, from about 1.9 to 2.3.

The CDBI of homogeneous ethylene/α-olefin interpolymers generally is greater than about 70 percent. CDBI is defined as the weight percent of polymer molecules having a comonomer content within 50% (i.e., ±50%) of the median total molar comonomer content CDBI can be determined by temperature rising elution fractionation as described by, for example, Wild et al., *J. Poly. Sci.- Poly. Phys. Ed.*, vol. 20, 441 (1982). Linear polyethylene, which does not contain a comonomer, is defined to have a CDBI of 100%. CDBI determination dearly distinguishes homogeneous copolymers (CDBI values generally above 70%) from presently available VLDPEs (CDBI values generally less than 55%).

Homogeneous ethylene/α-olefin interpolymers also typically exhibit an essentially single melting point with a peak melting point ($T_m$) as determined by differential scanning calorimetry (DSC), of from about 60° to 105° C., more precisely a DSC peak $T_m$ of from about 80° to 100° C. As used herein, the phrase "essentially single melting point" means that at least about 80% (by weight) of the material corresponds to a single $T_m$ at a temperature within the range of from about 60° C. to 105° C., and essentially no substantial fraction of the material has a peak melting point in excess of about 115° C. as determined by DSC analysis (e.g., on a Perkin Elmer™ System 7 Thermal Analysis System). The presence of higher melting peaks has been found to be detrimental to film properties such as haze and seal initiation temperature.

Regardless of the type of polymer(s) containing mer units derived from ethylene which is/are used in the outside layer, other layers can be present in the film. For example, the film can include a layer having a low permeance to oxygen, preferably an oxygen permeance at about 23° C. and 0% relative humidity of no more than about 150 $cm^3/m^2$·atm·24 hours, more preferably no more than about 100 $cm^3/m^2$·atm·24 hours, even more preferably no more than about 50 $cm^3/m^2$·atm·24 hours, and most preferably no more than about 20 $cm^3/m^2$·atm·24 hours. Such an $O_2$-barrier layer preferably has a thickness of from about 0.001 to about 0.05 mm, more preferably from about 0.002 to about 0.0075 mm, and most preferably from about 0.0025 to about 0.005 mm. Such an $O_2$-barrier layer can include one or more of EVOH, PVDC, polyalkylene carbonate, polyamide, and polyester. Preferably, any $O_2$-barrier layer is an inner layer of the film of the present invention.

Where the film of the present invention includes two or more layers, one or more tie layers can be used to provide increased adherence between the other layers. Such layers often have a relatively high degree of compatibility with polymers used in O$_2$-barrier layers (e.g., EVOH or polyamide) as well as with polymers used in other, non-barrier layers (e.g., polyolefins). When such a tie layer is present, it preferably is disposed on one or both primary sides of the O$_2$-barrier layer, more preferably directly adhered to one or both primary sides of the O$_2$-barrier layer. Such tie layers can include one or more polymers that contain mer units derived from at least one of C$_2$–C$_{12}$ α-olefin, styrene, amide, ester, and urethane, preferably one or more of anhydride-grafted ethylene/α-olefin interpolymer, anhydride-grafted ethylene/ethylenically unsaturated ester interpolymer, and anhydride-grafted ethylene/ethylenically unsaturated acid interpolymer.

The film of the present invention also can include one or more other layers which can serve as inner or outer layers and can be classified as bulk layers, abuse layers, etc. Such a layer can include one or more polymers that include mer units derived from at least one of a C$_2$–C$_{12}$ α-olefin, styrene, amides, esters, and urethanes. Preferred among these are those homo- and interpolymers that include mer units derived from ethylene, propylene, and 1-butene, even more preferably an ethylene interpolymer such as, for example, ethylene/C$_3$–C$_8$ α-olefin interpolymer, ethylene/ethylenically unsaturated ester interpolymer (e.g., ethylene/butyl acrylate copolymer), ethylene/ethylenically unsaturated acid interpolymer (e.g., ethylene/(meth)acrylic acid copolymer), and ethylene/vinyl acetate interpolymer. Preferred ethylene/vinyl acetate interpolymers are those that include from about 2.5 to about 27.5% (by wt.), preferably from about 5 to about 20% (by wt.), even more preferably from about 5 to about 17.5% (by wt.) mer units derived from vinyl acetate. Such a polymer preferably has a melt index of from about 0.3 to about 25, more preferably from about 0.5 to about 15, still more preferably from about 0.7 to about 5, and most preferably from about 1 to about 3.

In one embodiment, the film of the present invention can include a layer derived at least in part from a polyester and/or a polyamide. Examples of suitable polyesters include amorphous (co)polyesters, poly(ethylene/terephthalic acid), and poly(ethylene/naphthalate), although poly(ethylene/terephthalic acid) with at least about 75 mole percent, more preferably at least about 80 mole percent, of its mer units derived from terephthalic acid can be preferred for certain applications. Examples of suitable polyamides include polyamide 6, polyamide 9, polyamide 10, polyamide 11, polyamide 12, polyamide 66, polyamide 610, polyamide 612, polyamide 6I, polyamide 6T, polyamide 69, interpolymers made from any of the monomers used to make two or more of the foregoing homopolymers, and blends of any of the foregoing homo- and/or interpolymers.

Preferably, the film of the present invention includes from 2 to 20 layers; more preferably, from 2 to 12 layers; more preferably, from 2 to 9 layers; more preferably, from 3 to 8 layers.

Various combinations of layers can be used in the formation of the multilayer films according to the invention. Only 2- through 7-layer embodiments are provided here for illustrative purposes; however, the film of the invention also can include more layers. Given below are some examples of preferred combinations in which letters are used to represent film layers:

A/B, A/B/A, A/B/C, A/B/D, A/B/C/A, A/B/C/D, A/C/B/C/A, A/B/C/D/A, A/B/A/B/A, A/D/B/A, A/B/C/D/C', A/B/D/C, A/B/D/C/D, A/C/B/D, A/D/C/D, A/B/D/C/C', A/B/A/B/A, A/C/A/C/A wherein A represents a layer that includes a polymer including mer units derived from ethylene (as described supra);

B represents a layer including a polymer having a low permeance to oxygen (as described supra);

C and C' represent layers including one or more polymers that include mer units derived from at least one of a C$_2$–C$_{12}$ α-olefin, styrene, amide, ester, and urethane; and D represents a layer including a polyester or polyamide.

Of course, one or more tie layers can be used in any of the above structures.

Regardless of the number and order of layers in the film of the present invention, one or more conventional packaging film additives can be included therein. Examples of additives that can be incorporated include, but are not limited to, antiblocking agents, antifogging agents, slip agents, colorants, flavorants, antimicrobial agents, meat preservatives, and the like. (The ordinarily skilled artisan is aware of numerous examples of each of the foregoing.) Where the film is to processed at high speeds, inclusion of one or more antiblocking agents in and/or on one or both outer layers of the film structure can be preferred. Examples of useful antiblocking agents for certain applications are corn starch and ceramic microspheres.

The film of the present invention preferably exhibits a sufficient Young's modulus so as to withstand normal handling and use conditions. It preferably has a Young's modulus of at least about 100 MPa, more preferably at least about 125 MPa, and most preferably at least about 150 MPa. Young's modulus is measured in accordance with ASTM D 882, the teaching of which is incorporated herein by reference.

Where the film of the present invention is intended for shrink wrap applications, it preferably exhibits a shrink tension in at least one direction of at least about 0.33 MPa, more preferably at least about 0.67 MPa, up to about 3.5 MPa, more preferably up to about 3 MPa. In such instances, the film of the present invention preferably is heat shrinkable, more preferably biaxially oriented and heat shrinkable. At about 75° C., it preferably has a total free shrink of at least about 2.5%, more preferably at least about 5%, even more preferably at least about 10%.

The measurement of optical properties of plastic films, including the measurement of total transmission, haze, clarity, and gloss, is discussed in detail in Pike, LeRoy, "Optical Properties of Packaging Materials," *Journal of Plastic Film & Sheeting*, vol. 9, no. 3, pp. 173–80 (July 1993), which is incorporated herein by reference. Specifically, haze is a measurement of the transmitted light scattered more than 2.5° from the axis of the incident light The haze of a particular film is determined by analyzing it in accordance with 1990 *Annual Book of ASTM Standards*, section 8, vol. 08.01, ASTM D 1003, "Standard Test Method for Haze and Luminous Transmittance of Transparent Plastics", pp. 358–63, which is incorporated herein by reference. Haze results can be obtained using instrumentation such as, for example, an XL 211 HAZEGARD™ system, (Gardner/Neotec Instrument Division; Silver Spring, Md.), which requires a minimum sample size of about 6.5 cm$^2$. The film of the present invention preferably has a haze of less than about 20%, more preferably of less than about 15%, even more preferably less than about 10%, still more preferably less than about 7.5%, and most preferably less than about 5%.

The film of the present invention can have any total thickness desired as long as it can provide the desired properties, e.g. optics, modulus, seal strength, etc., for the particular packaging operation in which it is used. The film of the present invention preferably has a total thickness of from about 0.0075 to about 0.25 mm, more preferably from about 0.01 to about 0.125 mm, even more preferably from about 0.0125 to about 0.1 mm, and most preferably from about 0.015 to about 0.075 mm.

The film of the present invention can be irradiated, which involves subjecting a film material to radiation such as high energy electron treatment. This can alter the surface of the film and/or induce crosslinking between molecules of the polymers contained therein. The use of ionizing radiation for crosslinking polymers present in a film structure is disclosed in U.S. Pat. No. 4,064,296 (Bornstein et al.), the teaching of which is incorporated herein by reference.

If desired or necessary to, for example, increase adhesion to an enclosed meat product, all or a portion of the film of the present invention can be corona and/or plasma treated. These types of oxidative surface treatment involve bringing a film material into the proximity of an $O_2$- or $N_2$-containing gas (e.g., ambient air) which has been ionized. Exemplary techniques are described in, for example, U.S. Pat. Nos. 4,120,716 (Bonet) and 4,879,430 (Hoffman), the disclosures of which are incorporated herein by reference.

The film of the present invention can be used to package a variety of products although it optimally can be used to package a food substance, particularly meat products, cheese, and produce. Examples of meat products that can be packaged include, but are not limited to, poultry (e.g., turkey or chicken breast), bologna, braunschweiger, beef, pork, and whole muscle products such as roast beef. Examples of produce that can be packaged include, but are not limited to, cut and uncut lettuce, carrots, radish, celery, and the like. Especially when used to package produce and certain cuts of meat, the film of the present invention preferably has a high permeance to oxygen. For example, such films can have a permeance to oxygen at 23° C. and 0% relative humidity of at least about 150 $cm^3/m^2 \cdot atm \cdot 24$ hours, preferably at least about 100 $cm^3/m^2 \cdot atm \cdot 24$ hours, more preferably at least about 50 $cm^3/m^2 \cdot atm \cdot 24$ hours, and most preferably at least about 20 $cm^3/m^2 \cdot atm \cdot 24$ hours. Such films typically employ layers incorporating polyolefins and, optionally, layers incorporating styrene-containing polymers and interpolymers.

A bag can be made from the film of the present invention by sealing to itself the outer layer that includes a polymer containing mer units derived from ethylene, whereby that layer becomes the exterior layer of the bag. The bag can be an end-seal bag, a side-seal bag, an L-seal bag (i.e., sealed across the bottom and along one side with an open top), or a pouch (i.e., sealed on three sides with an open top). Additionally, lap seals can be employed.

The film of the present invention can also be used to overwrap plastic or foamed polymer trays. In such applications, the film typically is extended over the product-containing tray then sealed to itself or to the tray.

After forming a bag from the film (as just described), a product can be introduced into the bag, and the open end of the bag can be sealed. Alternatively, the film of the present invention can be wrapped substantially completely around a product and then heat sealed so as to form a package. Where such a bag or package is made from a heat shrinkable film, the film can shrink around the product when it is subjected to heat. Where the product being packaged is a food product, it can be cooked by subjecting the entire bag or package to an elevated temperature for a time sufficient to effectuate the degree of cooking desired.

Regardless of the structure and end use form of the film of the present invention, it bears printing on at least its outer surface. Packaging films typically are printed flexographically, and flexography is the preferred method for printing the film of the present invention. An exemplary flexographic method is described in U.S. Pat. No. 5,407,708 (Lovin et al.). Inks used in this and similar printing methods commonly involve pigment particles dispersed in a carrier resin.

Regardless of the manner in which the film is printed, the first ink layer ink, i.e., the one directly adhered to the surface layer, includes a resin containing a polymer which includes mer units derived from at least one $C_2$–$C_{12}$ α-olefin. The resin polymer preferably includes mer units derived from ethylene, more preferably mer units derived from ethylene and from one or more comonomers such as methyl (meth) acrylate, (meth)acrylic acid, and vinyl acetate. A particularly preferred resin polymer is an ethylene/vinyl acetate interpolymer. The first ink is printed directly on the surface layer without the need for a preliminary coating of a chemical primer.

The resin of the first ink, although chemically similar to the surface layer polymer which contains mer units derived from ethylene, has a polarity which is greater than that of this surface layer polymer. Although varying according to the particular polymers used in the surface layer and in the ink resin, the relative polarity of the ink resin generally is about 5 to about 50% greater than, preferably about 10 to about 25% greater than, that of the surface layer polymer. Without wishing to be bound by a particular theory, the greater polarity of the first ink resin (relative to the ethylene (inter)polymer of the surface layer) is believed to allow it to act as the equivalent of a tie layer between the surface layer of the film and the subsequently deposited ink layers. The first ink layer, in a sense, acts as a pigmented chemical primer.

The pigment contained in the first ink layer can be essentially any color including, but not limited to, black, white, cyan, magenta, yellow, and combinations of any of the foregoing. Nevertheless, a preferred pigment color is white.

Once the first ink layer is applied to the film, all subsequent ink layers are applied in a standard manner. Preferably, the subsequent ink layers are applied only to those areas of the film surface already printed by the first ink. Where the first ink layer contains white pigment, the second ink layer also advantageously can contain white pigment so that a double layer of white ink is obtained.

The second and subsequent ink layers can include a carrier resin similar to that described with respect to the first ink. However, advantageously, the subsequent ink layers can employ standard carrier resins such as, for example, those containing one or more of nitrocellulose, amide, urethane, epoxide, acrylate, and ester functionalities. Examples of such standard carrier resins include nitrocellulose/polyamide and nitrocellulose/polyurethane. These standard resin-containing inks adhere well to the film because they are applied over the above-described ink containing a carrier resin containing a polymer which includes mer units derived from at least one $C_2$–$C_{12}$ α-olefin. Although their polarities are greater than that of the first ink carrier resin, they are not so significantly greater that the different types of ink do not adhere well to one another and, ultimately, to the film substrate.

Objects and advantages of this invention are further illustrated by the following examples. The particular materials and amounts thereof, as well as other conditions and details, recited in these examples should not be used to unduly limit this invention.

EXAMPLES

Example 1

Four different Cryovac™ films with outside layers including a polymer having mer units derived from ethylene (hereinafter A, B, C, and D) were printed with the following inks and/or primers from Manders Premier (now a division of Flint Corp.; Ann Arbor, Mich.): Flexolefin™ 9035 EVA-based primer, Flexolefin™ 84-3-5361 EVA-based white ink, Permaflex™ white ink, and Permaflex™ blue ink. The primer was used without being diluted in a solvent (5% solids) and not reduced with solvent. The EVA-based white ink was reduced to 23 seconds (#2 Zahn cup) with a solvent blend of 80% n-propyl alcohol and 20% n-propyl acetate. The Permaflex™ inks were reduced to 25 seconds (#2 Zahn cup) with the same 80/20 alcohol-acetate.

Each film was secured around cardboard and drawdowns done with a spring loaded hand proofer (40/45 durometer rubber roller and Pamarco™ 360 screen, 6.2 billion $mm^3$ (hereinafter bcm) volume pyramid engraved anilox roller). The following combinations of primer and/or ink were used:

1 - Flexolefin™ primer/Flexolefin™ white ink
2 - Flexolefin™ primer/Flexolefin™ white ink/ Permaflex™ blue ink
3 - Flexolefin™ white ink only
4 - Flexolefin™ white ink/Permaflex™ white ink.

Film number 4 was printed with both Flexolefin™ and Permaflex™ white inks to increase the white opacity of a printed label.

Adhesion was checked 15 minutes after the rollout and again 24 hours later using a standard tape test. A piece of Scotch™ 600 clear adhesive tape (3M; St. Paul, Minn.) was placed across the surface with no air bubbles or wrinkles being present. The tape was pulled away from the surface with a quick smooth motion at a 45° angle. The adhesion result then was given a numeric rating from 1 to 5 (1=0% adhesion, total removal of ink; 2=25% adhesion; 3=50% adhesion, 4=75% adhesion; 5=100% adhesion, no ink removal). The results of the adhesion tests are summarized in the table below:

TABLE 1

| Combination | | D | C | B | A |
|---|---|---|---|---|---|
| 1 | 15 min. | 3 | 2 | 2 | 2 |
|   | 24 hour | 3 | 3 | 3 | 2 |
| 2 | 15 min. | 3 | 4 | 4 | 2 |
|   | 24 hour | 5 | 5 | 5 | 4 |
| 3 | 15 min. | 2 | 2 | 2 | 2 |
|   | 24 hour | 2 | 2 | 2 | 2 |
| 4 | 15 min. | 4 | 4 | 4 | 2 |
|   | 24 hour | 5 | 5 | 5 | 5 |

White opacity was measured in three different areas using a reflectance densitometer. The white density data is given below in Table 2.

TABLE 2

|   | Combination 3 | Combination 4 |
|---|---|---|
| D | .487 | .311 |
| C | .508 | .305 |
| B | .482 | .311 |
| A | .494 | .314 |

The data of Table 1 shows that a film printed with two white inks had as good or better ink adhesion than do films using a primer-ink combination. From the data of Table 2, one can see that applying two white inks significantly improves white opacity.

Example 2

The testing of Example 1 was repeated with the addition of an extra color, Permaflex™ black ink, and also a higher solids Flexolefin™ white ink. It was reduced with the same 80/20 solvent blend to 32 seconds (#2 Zahn cup). The rollout combinations were as follows:

5- ok Flexolefin™ white ink/Permaflex™ white ink
6- Flexolefin™ white ink/Permaflex™ white ink/ Permaflex™ blue ink/Permaflex™ black ink
7- Permaflex™ white ink (a standard for white density readings)

Adhesion results are given below in Table 3, and white density data are shown in Table 4.

TABLE 3

| Combination | | D | C | B | A |
|---|---|---|---|---|---|
| 5 | 15 min | 5 | 4.5 | 4 | 5 |
|   | 24 hour | 5 | 5 | 5 | 5 |
| 6 | 15 min. | 4 | 3 | 4 | 3 |
|   | 24 hour | 4 | 4.5 | 5 | 4 |

TABLE 4

|   | Combination 7 | Combination 5 |
|---|---|---|
| D | .381 | .295 |
| C | .351 | .289 |
| B | .348 | .306 |
| A | .385 | .299 |

The data of Tables 3 and 4 show that excellent adhesion can be achieved without the use of a conventional primer while simultaneously increasing opacity through the use of a "dual ink" combination according to the present invention. Additionally by comparing the data from Table 2 with those from Table 4, one can see that higher solids levels can provide improved opacity.

Example 3

Flexolefin™ 84-3-9948 thinner, which is more compatible with Flexolefin™ inks, was used to reduce the Flexolefin™ white ink to 26 seconds (#2 Zahn cup). Rollouts were conducted on the D and the A films. Once again, Permaflex™ white and colored inks were applied over the EVA-white ink. The rollout combinations were as follows:

8 - Flexolefin™ white ink/Permaflex™ white ink
9 - Flexolefin™ white ink/Permaflex™ white ink/ Permaflex™ black ink
10- Flexolefin™ white ink/Permaflex™ white ink/ Permaflex™ black ink/Permaflex™ blue ink
11- Flexolefin™ white ink/Permaflex™ white ink/ Permaflex™ blue ink
12- Permaflex™ white ink (a standard for white density readings)

Adhesion results are given below in Table 5, and white density data are given in Table 6.

TABLE 5

| Combination | | D | A |
|---|---|---|---|
| 8 | 15 min. | 4 | 2 |
| | 24 hour | 5 | 5 |
| 9 | 15 min. | 5 | 2 |
| | 24 hour | 5 | 5 |
| 10 | 15 min. | 3 | 1 |
| | 24 hour | 4 | 4 |
| 11 | 15 min. | 2 | 1 |
| | 24 hour | 5 | 4 |

TABLE 6

| | Combination 12 | Combination 8 |
|---|---|---|
| D | .335 | .277 |
| A | .333 | .261 |

The data of Tables 5 and 6 show that acceptable adhesion and improved opacity can be achieved by using a "dual ink" combination according to the present invention and that, through use of a compatible reducing solvent, improved opacities at lower viscosities can be achieved.

Example 4

Two other Cryovac™ films with outside layers including a polymer having mer units derived from ethylene (hereafter E and F) were printed on a six-color flexographic stacked, carrier web press. The Flexolefin™ white ink was printed at two different viscosities, 47 and 35 seconds (#2 Zahn cup). It was reduced with the recommended solvent mentioned in Example 3. The press was set up with white ink having a viscosity of 47 seconds, and the rolls were printed at this viscosity level. Next, the viscosity of the white ink was reduced to 35 seconds and a roll of the E film was printed.

The colors that were printed were Sun Shrink™ F system (Sun Chemical Co.; Fort Lee, N.J.). Gold, red, and warm red inks were printed over the Flexolefin™ ink white. Additionally, a control was printed with Sun Shrink™ F primer and white ink in addition to the colors. The press operated at 250 feet per min (1.3 m/s) with between-color and tunnel dryer temperatures at 60° C.

All of the samples printed were evaluated for 60° gloss and white density in addition to adhesion. The adhesion was checked in three different areas on the label for three consecutive impressions at the top of the roll. The adhesion data are summarized below in Table 7, while the density data are shown in Table 8.

TABLE 7

| | Adhesion at | |
|---|---|---|
| Description | 15 min. | 24 hour |
| E with standard primer and white ink comparitive | 4.3 | 4.3 |
| E with Flexolefin ™ white ink (no primer) at 47 seconds | 4.0 | 5.0 |
| E with Flexolefin ™ white ink (no primer) at 35 seconds | 4.0 | 5.0 |
| F with standard primer and white ink comparitive | 4.3 | 5.0 |
| F with Flexolefin ™ white ink (no primer) at 47 seconds | 4.0 | 5.0 |

TABLE 8

| Film Type | White Density |
|---|---|
| E* (comparative) | .322 |
| E with Flexolefin ™ white ink at 47 seconds | .271 |
| E with Flexolefin ™ white ink at 35 seconds | .352 |
| F* (comparative) | .332 |
| F with Flexolefin ™ white ink at 47 seconds | .296 |

*These rolls were printed with primer and standard white ink.

The data from Tables 7 and 8 show that a "dual ink" system provides adhesion which is comparable to that provided by a primer-ink combination while yielding better opacity (i.e., color density).

Various modifications and alterations that do not depart from the scope and spirit of this invention will become apparent to those skilled in the art. This invention is not to be unduly limited to the illustrative embodiments set forth herein.

We claim:

1. A printed film comprising:
   a) a film having a surface layer comprising a polymer comprising mer units derived from ethylene; and
   b) an ink comprising pigment particles dispersed in a resin directly adhered to said surface layer, said resin comprising a polymer comprising mer units derived from at least one $C_2$–$C_{12}$ α-olefin and said resin having a polarity greater than that of said surface layer polymer which comprises mer units derived from ethylene.

2. The printed film of claim 1 wherein said resin polymer comprises mer units derived from ethylene.

3. The printed film of claim 2 wherein said resin polymer further comprises mer units derived from at least one of methyl (meth)acrylate, (meth)acrylic acid, and vinyl acetate.

4. The printed film of claim 1 further comprising a second ink which comprises pigment particles dispersed in a resin, said second ink being applied only to those areas of said film already printed by said first ink.

5. The printed film of claim 4 wherein said first ink resin polymer comprises mer units derived from ethylene.

6. The printed film of claim 5 wherein said first ink resin polymer further comprises mer units derived from at least one of methyl (meth)acrylate, (meth)acrylic acid, and vinyl acetate.

7. The printed film of claim 4 wherein said resin of said second ink has a polarity greater than that of said resin of said first ink.

8. The printed film of claim 7 wherein said resin of said second ink comprises one or more of nitrocellulose, amide, urethane, epoxide, acrylate, and ester functionalities.

9. The printed film of claim 4 wherein said pigment, particles of both of said first and second inks are white in color.

10. The printed film of claim 1 wherein said film is a monolayer film.

11. The printed film of claim 1 wherein said film comprises more than one layer.

12. The printed film of claim 11 wherein the more than one layer comprises an ethylene/vinyl acetate interpolymer.

13. The printed film of claim 11 wherein said film has an oxygen permeance of at least about 1000 $cm^3/m^2$·atm·24 hours at about 23° C. and 0% relative humidity.

14. The printed film of claim 1 wherein said surface layer polymer comprising mer units derived from ethylene is a heterogeneous or homogenous ethylene/α-olefin interpolymer.

15. The printed film of claim 1 wherein said surface layer polymer comprising mer units derived from ethylene is a homogenous ethylene/α-olefin interpolymer.

16. The printed film of claim 1 wherein said film shrinks at least 5% when subjected to a temperature of at least about 75° C.

17. The printed film of claim 1 wherein said surface layer of said film is essentially free of chemical primer.

18. The printed film of claim 1, wherein said surface layer comprises an ethylene/vinyl acetate interpolymer.

19. A package comprising:
a) a product; and
b) substantially completely surrounding said product, the film of claim 1.

20. The package of claim 18 wherein said product comprises a food substance.

21. A package comprising:
a) a product; and
b) substantially completely surrounding said product, the film of claim 4.

* * * * *

UNITED STATES PATENT AND TRADEMARK OFFICE
CERTIFICATE OF CORRECTION

PATENT NO.    : 6,231,953 B1
DATED         : May 15, 2001
INVENTOR(S)   : Mendy W. Mossbrook, Kenneth M. Register, Chien-Lu Hsu, and J. Milton Bowen Page 1 of 1

It is certified that error appears in the above-identified patent and that said Letters Patent is hereby corrected as shown below:

<u>Column 16,</u>
Line 5, the number "18" should be -- 19 --.

Signed and Sealed this

Twenty-ninth Day of January, 2002

Attest:

Attesting Officer

JAMES E. ROGAN
*Director of the United States Patent and Trademark Office*